US008679429B2

(12) United States Patent
Gohara et al.

(10) Patent No.: US 8,679,429 B2
(45) Date of Patent: Mar. 25, 2014

(54) HEXAGONAL BORON NITRIDE POWDER HAVING SPECIFIC BULK DENSITY AND RESIDUAL FE PARTICLES, AND METHOD FOR PRODUCING SAME

(75) Inventors: Taisei Gohara, Kurashiki (JP); Takahisa Koshida, Kurashiki (JP); Shoichi Hiwasa, Kurashiki (JP)

(73) Assignee: Mizushima Ferroalloy Co., Ltd., Okayama (JP)

( * ) Notice: Subject to any disclaimer, the term of this patent is extended or adjusted under 35 U.S.C. 154(b) by 0 days.

(21) Appl. No.: 13/440,859

(22) Filed: Apr. 5, 2012

(65) Prior Publication Data

US 2012/0196128 A1 Aug. 2, 2012

Related U.S. Application Data

(63) Continuation of application No. PCT/JP2010/006027, filed on Oct. 18, 2010.

(30) Foreign Application Priority Data

Oct. 9, 2009 (JP) .................................. 2009-235647

(51) Int. Cl.
*B32B 5/16* (2006.01)
*C01B 21/064* (2006.01)

(52) U.S. Cl.
USPC ............ 423/209; 423/406; 423/409; 428/402

(58) Field of Classification Search
USPC ............................ 423/290, 406, 409; 428/402
See application file for complete search history.

(56) References Cited

U.S. PATENT DOCUMENTS

| 4,107,276 | A | * | 8/1978 | Schwetz et al. | ............... | 423/290 |
| 4,192,644 | A | * | 3/1980 | Westerhoff et al. | ........... | 432/122 |
| 4,853,196 | A | * | 8/1989 | Koshida et al. | ............... | 423/290 |
| 5,869,015 | A | * | 2/1999 | Vagarali | ........................ | 423/290 |
| 7,192,644 | B2 | * | 3/2007 | Paine, Jr. | ........................ | 428/402 |
| 2005/0281726 | A1 | * | 12/2005 | Paine, Jr. | ........................ | 423/277 |

FOREIGN PATENT DOCUMENTS

| JP | 60-033204 | 2/1985 |
| JP | 62-100404 | 5/1987 |
| JP | 5-000808 | 1/1993 |
| JP | 9-295801 | 11/1997 |
| JP | 11-277515 | 10/1999 |
| JP | 2007-502770 | 2/2007 |
| JP | 2007-308360 | 11/2007 |

OTHER PUBLICATIONS

Machine translation of JP 2007-308360 (2007).*
International Search Report for International Application No. PCT/JP2010/006027, mailed Dec. 21, 2010, 7 pages.
Office Action for related China Patent Application No. 2010-80045046.5 (with English translation), dated Sep. 3, 2013, 14 pages.
Office Action for related Korea Patent Application No. 10-2012-7009087 (with English translation), dated Oct. 31, 2013, 5 pages.

* cited by examiner

*Primary Examiner* — Hoa (Holly) Le
(74) *Attorney, Agent, or Firm* — Klarquist Sparkman, LLP

(57) ABSTRACT

A hexagonal boron nitride (h-BN) powder is disclosed in which primary particles of the powder exhibit a ratio (D/d) of long diameter (D) to thickness (d) in a range of 5 to 10. Agglomerated particle bodies made of the primary particles have an average particle diameter ($D_{50}$) in a range of 2 μm to 200 μm, inclusive, and the powder has a bulk density in a range of 0.5 g/cm³ to 1.0 g/cm³. In an exemplary method for producing the h-BN, boron carbide is nitridizated in a nitrogen partial pressure of at least 5 kPa at 1800° C. to 2200° C., inclusive. $B_2O_3$ (or precursor thereof) is added to the nitridization product to produce a mixture. The mixture is decarbonized in a non-oxidizing atmosphere at a 1500° C. to 2200° C., inclusive. The decarbonization product is pulverized and subject to particle-size classification, yielding H-BN powder. The method includes a depressurizing step, performed at 100 kPa or less either during nitridization or after decarbonization.

8 Claims, 7 Drawing Sheets ably; and (3) conventional h-BN significantly contains voids, which degrade the thermal conductivity of the h-BN. Accordingly, there is a need for further improving the chargeability of hexagonal boron nitride powder and further reducing impurities in the powder such as electrically conductive substances.

HEXAGONAL BORON NITRIDE POWDER HAVING SPECIFIC BULK DENSITY AND RESIDUAL FE PARTICLES, AND METHOD FOR PRODUCING SAME

CROSS-REFERENCE TO RELATED APPLICATIONS

This application is a continuation of International Application No. PCT/JP2010/006027, filed on Oct. 8, 2010, which claims priority to and the benefit of Japan Patent Application No. 2009-235647, filed in the JPO on Oct. 9, 2009. The contents of both are incorporated herein by reference in their respective entireties.

TECHNICAL FIELD

The present invention relates to hexagonal boron nitride powder and methods for producing the same. More specifically, the present invention relates to hexagonal boron nitride powder having improved thermal conductivity and electrically insulative properties, and to methods for producing the same.

PRIOR ART

Hexagonal boron nitride (h-BN) powder is widely used in various fields including solid lubricants, mold-release agents for glass, insulating and heat-dissipating materials, and materials for cosmetics. This hexagonal boron nitride powder is conventionally produced, for example, by reacting a boron compound such as boric acid or boric acid salt with a nitrogen compound such as urea or amine at a relatively low temperature to produce coarse h-BN powder having low crystallinity. The coarse h-BN powder thus obtained is heated to a relatively high temperature to induce crystallization and crystal growth, as disclosed in JP-A 09-295801.

Generally, h-BN powder has a layered structure similar to that of graphite and exhibits advantageous characteristics as an electrical material, such as: (1) high thermal conductivity and good heat-dissipation properties; (2) good electrical insulation and high dielectric strength; and (3) the lowest dielectric constant among ceramics. People are now paying attention, for example, to sheets and tapes having excellent thermal conductivity (heat-dissipation properties) and electrically insulative properties, produced by adding h-BN to a resin material such as epoxy resin, silicon rubber, and the like.

When h-BN powder is used for such applications as described above, the substitutability of h-BN powder for resin, i.e., the "chargeability" of h-BN powder with respect to resin, significantly affects thermal conductivity. Accordingly, it is desired to improve the chargeability of h-BN powder to attain a satisfactorily high thermal conductivity.

The chargeability of conventional h-BN powder is not satisfactory. Consequently, the thermal conductivity of a sheet or a tape produced by adding conventional h-BN powder to resin does not always meet the specifications required by customers.

To solve the problems described above, Applicants previously developed a novel hexagonal boron nitride powder, of which the size of primary particles (long-side length), ratio of long-side length to short-side length of primary particles, size of secondary (agglomerated) particles, and the like are controlled within optimum ranges, as disclosed in JP-A 2007 308360. However, considering that electrically insulative sheets have become progressively thinner in recent years, remaining problems are: (1) unfavorable electrically conductive contaminants that degrade electrically insulative properties of h-BN still significantly exist in conventional h-BN; agglomerated particles of conventional h-BN tend to break up when processed into composite materials, which is undesirable; and (3) conventional h-BN significantly contains voids, which degrade the thermal conductivity of the h-BN. Accordingly, there is a need for further improving the chargeability of hexagonal boron nitride powder and further reducing impurities in the powder such as electrically conductive substances.

DISCLOSURE OF THE INVENTION

Problems to be Solved by the Invention

As a result of development of the hexagonal boron nitride powder disclosed in JP-A 2007-308360, the chargeability and thermal conductivity of hexagonal boron nitride powder have been improved. The present invention relates to further improvements made to the hexagonal boron nitride powder disclosed in JP-A 2007-308360. An object of the invention is to provide hexagonal boron nitride powder, in which the shapes of agglomerated particles are more spherical than in the h-BN disclosed in JP-A 2007-308360. Another object is to improve the chargeability and strength of the powder and enhance the purity of h-BN, compared to the conventional powder disclosed in JP-A 2007-308360, and to improve its electrical insulative property. Another object is to stabilize the "withstand voltage" of heat-dissipation sheets or the like in which the h-BN powder has been charged. Yet another object is to provide hexagonal boron nitride powder, in which the shape of Fe remaining as an impurity in the h-BN powder is controlled, or more specifically, made more spherical to alleviate the tolerable content of residual Fe, compared to the conventional h-BN disclosed in JP-A 2007-308360.

Means for Solving the Problem

Hereinafter, the history of the present invention will be described.

Making the shapes of particles of the powder as spherical as possible is advantageous in terms of improving the chargeability of the h-BN powder and thus the thermal conductivity of the powder. However, particles of h-BN powder cannot be made satisfactorily spherical by conventional methods. As a method of making particles of h-BN powder spherical, there has been proposed a method of subjecting h-BN powder, after production thereof, to a separate process in which the particles of the powder are made spherical. However, this method has disadvantages in that it requires an extra process, which increases production costs (see JP-A 11-277515).

Further, in the aforementioned conventional production methods, Fe at a concentration of up to approximately 1000 ppm, which exceeds tolerable values is inevitably present in h-BN powder due to the Fe component ($Fe_2O_3$) that usually contaminates the boric acid used as a raw material for forming $B_4C$. Fe also originates from the pulverizing device used in an agglomeration-pulverizing process applied after production of the $B_4C$. Fe is removed by magnetic separation, acid-cleaning treatment or the like after production of h-BN powder in the conventional method. However, the Fe-removal treatment makes the whole production process complicated and increases production cost. Above all, this Fe-removal process has a problem in terms of reliability.

In view of the situation described above, Applicants made a keen study to find a method which enables making particles of h-BN powder more spherical than can be produced by conventional methods, without requiring a separate pulverizing process after production of the powder. The discovered method also enables reducing the concentration of impurity Fe in the powder. Applicants discovered that Fe as impurity is effectively removed, in the subject method, by evaporation achieved by conducting a depressurization treatment. The depressurization treatment is conducted either during nitridization of $B_4C$ or after decarbonizing subsequent to nitridization. Applicants also discovered that the depressurizing treatment not only removes Fe by evaporation but also (if some Fe remains in the h-BN powder) makes the residual Fe spherical and thus harmless. Applicants also discovered that, during execution of the depressurizing treatment, agglomerated particles of the produced h-BN powder are made denser and more spherical than in the prior art. The powder stably exhibits enhanced strength and significantly high bulk density (0.5 $g/cm^3$ to 1.0 $g/cm^3$). The present invention has been derived on the basis of these discoveries.

Specifically, certain features of the present invention are as follows:

1. Hexagonal boron nitride powder is provided in which a ratio (D/d) of long diameter (D) to thickness (d) of a primary particle is in the range of 5 to 10. The average particle diameter ($D_{50}$) of an agglomerated particle body made of the primary particles is in the range of 2 μm to 200 μm inclusive (i.e., inclusive of 2 μm and 200 μm). The bulk density of the powder is in the range of 0.5 $g/cm^3$ to 1.0 $g/cm^3$.

2. The hexagonal boron nitride powder desirably has an average particle diameter ($D_{50}$) in the range of 20 μm to 80 μm inclusive (i.e., inclusive of 20 μm and 80 μm). The void ratio of the agglomerated particle body is not greater than 50%.

3. The agglomerated particle bodies desirably are obtained by baking.

4. The hexagonal boron nitride powder desirably has a powder strength of at least 0.4. "Powder strength" is a ratio of one average particle diameter to another average particle diameter of the agglomerated particle bodies. The "one average particle diameter" is obtained by injecting hexagonal boron nitride powder in a dry condition at a pressure of 0.3 MPa and measuring particle diameters of the agglomerated particle bodies sufficiently to obtain an average particle diameter of the agglomerated particle bodies. The "another average particle diameter" is obtained by injecting hexagonal boron nitride powder in a dry condition at a pressure of 0.01 MPa and measuring particle diameters of the agglomerated particle bodies sufficiently to obtain an average particle diameter of the agglomerated particle bodies.

5. Desirably, the content of Fe as an impurity in the hexagonal boron nitride powder is not greater than 500 ppm. The Spherical particles of contaminant Fe desirably are not larger than 50 μm.

6. An embodiment of a method for producing hexagonal boron nitride powder comprises the following steps:

boron carbide is subjected to nitridization, in a nitrogen atmosphere having a nitrogen partial pressure of at least 5 kPa, at a temperature in the range of 1800° C. to 2200° C.;

$B_2O_3$ and/or a precursor thereof is added to the product of nitridization;

the resulting mixture is decarbonized in a non-oxidizing atmosphere at a temperature of 1500° C. to 2200° C.; and the product of decarbonization is pulverized, and the resulting particles are size-classified, thereby producing hexagonal boron nitride powder; and either during nitridization or after decarbonization, a depressurization is performed in which the furnace internal pressure is adjusted to 100 kPa or less.

More desirably, depressurization is performed in a depressurized atmosphere at 80 kPa or less.

Effect of the Invention

According to the present invention, the shapes of agglomerated particle bodies of h-BN powder are more spherical. As a result the powder can be made denser than conventional h-BN powder, powder strength is enhanced, chargeability and thermal conductivity of the powder are improved, and the dielectric constant of the h-BN powder is more stable. Also, residual Fe is substantially removed from the h-BN powder; any remaining Fe in the h-BN powder is made spherical and harmless, so that the electrically insulative properties of the powder are improved. Forming residual Fe as small spheres having a relatively small maximum diameter also stabilizes the "withstand voltage" (breakdown voltage) of the h-BN powder (Fe conventionally reduces the withstand voltage of h-BN powder).

PREFERRED EMBODIMENTS

Figure 1:
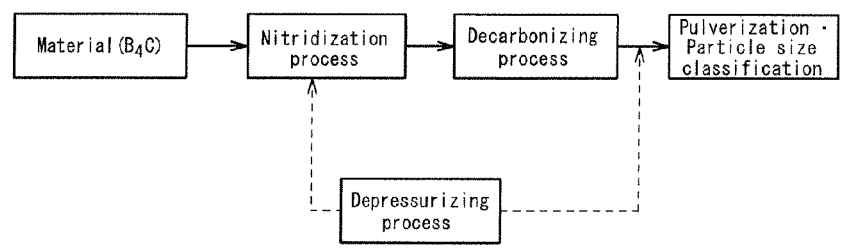
FIG. 1 is a flow chart of an embodiment of a process for producing hexagonal boron nitride powder.

The present invention will be described in detail hereinafter. First, an explanation is given of the reasons for which shapes and the like of particles are restricted to the aforementioned ranges in h-BN.

The desired ratio of the long diameter to the thickness of a primary particle is 5 to 10. It is difficult to set an average of ratios (D/d) of the long diameter (D) to thickness (d) of a primary particle to less than 5 in actual production. On the other hand, an average ratio (D/d) exceeding 10 tends to cause a specific orientation of the particles, resulting in a decreased density (i.e., increased void ratio) of agglomerated powder bodies. Accordingly, the ratio (D/d) desirably is in the range of 5 to 10. D/d is preferably in the range of 6 to 9. The long diameter (D) and thickness (d) of a primary particle are preferably in the ranges of 2 μm to 8 μm and 0.1 μm to 1.6 μm, respectively.

Regarding agglomerated particle bodies made of primary particles, the average particle diameter ($D_{50}$) of an agglomerated particle body is in the range of 2 μm to 200 μm (inclusive of 2 μm and 200 μm). Whenever an agglomerated particle body made of primary particles of powder that have an average particle diameter ($D_{50}$) smaller than 2 μm, the agglomerated body has actually already been pulverized to primary particles, which produces scale-like structures that fail to remain as agglomerated particle bodies. Whenever the average particle diameter ($D_{50}$) exceeds 200 µm, the agglomerated body cannot reliably maintain its shape, which renders the body susceptible to abrasive pulverization and variable particle size during production. Accordingly, the size of agglomerated particle bodies made of primary particles, denoted by $D_{50}$, desirably is limited by $D_{50}$ being in the range of 2 µm to 200 µm (inclusive of 2 µm and 200 µm), preferably in the range of 5 µm to 100 µm (inclusive of 5 µm and 100 µm). $D_{50}$ is even more preferably in the range of 20 µm to 80 µm (inclusive of 20 µm and 80 µm) because, in this range, the void ratio is 50% or less. Agglomerated particle bodies have an appropriate density whenever $D_{50}$ satisfies this optimum range of particle diameter. Although the lower limit of void ratio is not particularly specified, the practical lower limit of the void ratio is around 10% because it is difficult to completely eliminate voids in h-BN (of which the crystal grains grow anisotropically). The void ratio of agglomerated particle bodies can be determined by measuring the volume of micropores using a mercury porosimeter.

The bulk density of agglomerated particle bodies made of primary particles desirably is in the range of 0.5 g/cm³ to 1.0 g/cm³. Whenever the bulk density of agglomerated particle bodies made of primary particles is less than 0.5 g/cm³, the h-BN powder cannot be sufficiently added to a resin. On the other hand, whenever the bulk density reaches an upper limit at 1.0 g/cm³, the powder is most densely charged. Accordingly, the bulk density of agglomerated particle bodies made of primary particles desirably is in the range of 0.5 g/cm³ to 1.0 g/cm³, preferably in the range of 0.6 g/cm³ to 0.9 g/cm³.

The powder strength desirably is at least 0.4. According to this invention, it is possible to make agglomerated particle bodies satisfactorily spherical and dense. As a result, it is possible for the powder strength to be at least 0.4, wherein "powder strength" is a ratio of one average particle diameter with respect to another average particle diameter of agglomerated particle bodies. The "one average particle diameter" is obtained by injecting hexagonal boron nitride powder, in a dry condition and at a pressure of 0.3 MPa, and measuring particle diameters of the agglomerated particle bodies to determine the average particle diameter of the agglomerated particle bodies. The "another average particle diameter" is obtained by injecting hexagonal boron nitride powder, in a dry condition and at a pressure of 0.01 MPa, and measuring particle diameters of the agglomerated particle bodies to determine the average particle diameter of the agglomerated particle bodies. Powder strength of h-BN is a result of the particles bonding to each other during particle growth. It should be noted that, in the process of the present invention, the upper limit of powder strength is around 0.85 because the bonding of particles described above occurs concurrently with removing carbon as CO. The powder strength of conventional hexagonal boron nitride powder, produced by the method disclosed in JP-A 09-295801 and analyzed by the powder-strength measurement method described herein, is only 0.2 or so.

As used herein, a "primary particle" is a single particle constituting each scale-like structure. An "agglomerated particle body" is a secondary particle, formed as an agglomeration of primary particles, in which two or more primary particles are chemically bonded to each other. In the BN powder of the present invention, at least 60% of the powder exists in the form of agglomerated particle bodies. The lesser the amount of micropowder generated by peeling or the like, the better. If micro powder is present in hBN at a concentration greater than 20%, filler properties of the h-BN are degraded. Accordingly, the proportion of agglomerated particle bodies in the h-BN powder as a whole is preferably at least 80%. The upper limit of this proportion is around 97% because some agglomerated particle bodies are inevitably destroyed as a result of pulverizing.

Next, an embodiment of a method for producing hexagonal boron nitride powder according to the present invention is described. In general, h-BN powder is produced by baking boron carbide ($B_4C$) as a raw material in a furnace containing a nitrogen atmosphere and subjecting the product thus obtained to decarbonization, followed by pulverization and particle-size classification, as shown in the flow-chart of FIG. 1. The method also includes a depressurization step either during nitridization of $B_4C$ or after the decarbonization step performed after nitridization. Respective production steps are:

First, to produce $B_4C$, boric acid ($H_3BO_3$) as a raw material is reacted with a carbon-containing material in a non-oxidizing atmosphere at a relatively high temperature:

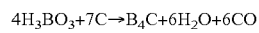
$$4H_3BO_3 + 7C \rightarrow B_4C + 6H_2O + 6CO$$

The product of this reaction is pulverized, followed by particle-size classification, to produce $B_4C$ powder. The carbon-containing material is typically coke, which contains Fe as an impurity. Another source of Fe is the pulverization device, from which the Fe is inevitably mixed into the $B_4C$ powder because $B_4C$ thus synthesized is a very hard and abrasive material. This Fe contamination is particularly distinct in $B_4C$ powder according to the present invention because the $B_4C$ powder should be thoroughly pulverized to facilitate chemical reactions.

The $B_4C$ powder thus obtained is then baked in a furnace containing a nitrogen atmosphere (i.e., subjected to nitridization) to produce BN powder, according to the following reaction:

$$(1/2)B_4C + N_2 \rightarrow 2BN + (1/2)C \quad (1)$$

A sufficiently high nitrogen partial pressure and temperature are necessary to make this reaction proceed smoothly. Specifically, the nitrogen partial pressure desirably is at least 5 kPa, and the baking temperature in the furnace desirably is in the range of 1800° C. to 2200° C., preferably in the range of 1900° C. to 2100° C. A nitrogen partial pressure below 5 kPa slows nitridization, which prolongs the time required for completion of the reaction. Accordingly, an atmosphere having a relatively high nitrogen partial pressure is effective for driving nitridization forward. The upper limit of nitrogen partial pressure is around 1000 kPa for security reasons involving the safe handling of high-pressure gas. A baking temperature less than 1800° C. slows the reaction. A baking temperature exceeding 2200° C. causes a reverse reaction and stops the nitridization reaction from going forward. The particle size of the $B_4C$ powder as a raw material is not particularly restricted but desirably is not greater than 1000 µm (preferably not less than 2 µm).

The BN powder obtained by the aforementioned reaction is then subjected to decarbonization to remove carbon remaining in the BN powder. During decarbonization the BN powder is mixed with $B_2O_3$ and/or a precursor thereof (the $B_2O_3$ and/or its precursor may be referred to herein as "$B_2O_3$ and the like") so that residual C is removed as CO gas by the following reaction:

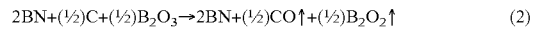
$$2BN + (1/2)C + (1/2)B_2O_3 \rightarrow 2BN + (1/2)CO\uparrow + (1/2)B_2O_2\uparrow \quad (2)$$

Decarbonization desirably is performed in a non-oxidizing atmosphere under the following temperature conditions:

desirably 1500° C. to 2200° C. (preferably 1800° C. to 2200° C.) for desirably at least one hour (preferably at least 6 hours and not longer than 15 hours). Sufficiently high temperature and sufficiently long treatment time result in successful reduction of the carbon content in the BN powder to desirably 0.5% (w/w) or less or preferably 0.2% (w/w) or less. The carbon content cannot be reduced to less than 0.01% (w/w) in this production process. A normal pressure is sufficient during decarbonization. The nitridized material, such as BN powder, and "$B_2O_3$ and the like" are mixed together in this decarbonization step desirably by using a dry-type mixing device such as a V-blender. Alternatively, the mixing may be performed in a wet condition by adding a solvent and using a ball mill. Mixing is continued to homogeneity, in which condition the mixture visually exhibits a uniform grey color.

The precursor of $B_2O_3$ is a boron compound that can be converted into $B_2O_3$ by heating. Specific examples of the precursor include ammonium salt of boric acid, orthoboric acid, metaboric acid, tetraboric acid, and the like. $B_2O_3$ is particularly desired among these examples of "$B_2O_3$ and the like," i.e., $B_2O_3$ and the precursor thereof. By-product carbon generated during production of BN powder is removed as carbon monoxide according to reaction (2), above. Reaction (2) generally proceeds at a temperature of at least 1500° C. Evaporation of $B_2O_3$ occurs at a temperature of 1600° C. or higher. Since reaction (2) and evaporation of $B_2O_3$ both involve generation of gases, effective removal of gases thus generated facilitates the reaction and the evaporation effectively.

The subject method characteristically includes a depressurizing step either during nitridization of $B_4C$ or after decarbonization, thereby producing dense BN powder, removing some Fe from the BN, and causing residual Fe to assume a spherical shape, which makes the residual Fe harmless. The aforementioned characteristic features of the subject method are now described in detail. The boric acid used for $B_4C$ production typically includes as impurities $Fe_2O_3$, CaO, $SiO_2$, $Al_2O_3$, and the like. Among these impurities, the electrically insulative compounds CaO, $SiO_2$, $Al_2O_3$, and the like do not particularly cause problems if present in the BN powder at a concentration of less than 5%. The reduced concentrations of these oxide impurities facilitate realization of desired characteristics of the h-BN. The concentration of such oxide impurities as described above can be reduced to 0.01% by using a commercially available high-purity boric acid material. In contrast, $Fe_2O_3$ is preferably removed as much as possible because $Fe_2O_3$ is electrically conductive. Whenever the $Fe_2O_3$ content exceeds 500 ppm, the electrically insulative property of h-BN deteriorates. Accordingly, the $Fe_2O_3$ content is preferably not greater than 500 ppm. More specifically, good electrically insulative properties can be stably maintained at a concentration of $Fe_2O_3$ not greater than 250 ppm. The lower limit of $Fe_2O_3$ concentration, which depends on the Fe content in the starting materials, is generally 20 ppm. This extraneous Fe is slightly mixed into the product during particle-size classification.

Figure 2:
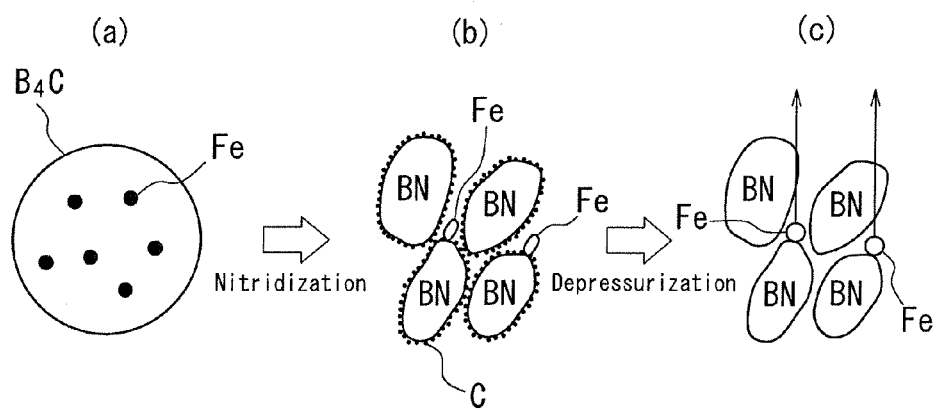
FIGS. 2(a)-2(c) are diagrams showing a process of removing, by evaporation, Fe present as an impurity in $B_4C$ powder. This removal is performed by executing a depressurization process during nitridization, according to the present invention.

Fe as an impurity exists in $B_4C$ powder in a manner as schematically shown in FIG. 2A. Whenever Fe is removed during nitridization, for example, it is preferable that Fe be removed by evaporation (by subjecting $B_4C$ to depressurization during the period when $B_4C$ starts reacting with $N_2$). The temperature desirably is in the range of 1800° C. to 2200° C. Providing gas flow is effective in facilitating flow of Fe vapor from the powder.

As $N_2$ gas infiltrates $B_4C$, the generation of BN particles commences by nitridization, producing a situation as shown in FIG. 2B in which Fe as an impurity exists in gaps between BN particles. In FIG. 2B small black dots around each BN particle represent carbon.

Subjecting BN particles in the situation shown in FIG. 2B to a depressurization step results in effective removal of Fe from between BN particles by evaporation of Fe from the gaps. If some Fe remains between BN particles without being removed by depressurization, the residual Fe is formed into spherical particles by the depressurization. As a result, the electrically insulative property of the BN is preserved, enabling the BN to withstand higher breakdown voltages in a stable manner.

Depressurization desirably is performed by setting the nitrogen atmosphere in the furnace at an internal pressure less than ambient pressure (i.e., less than 100 kPa). The Fe concentration in the BN powder can be reduced to 500 ppm or less by this treatment. Breakdown-voltage properties of BN powder are also improved by decreasing the Fe concentration in the BN powder desirably to 400 ppm or less, preferably to 250 ppm or less. More specifically, the internal pressure of the furnace used for pressurization desirably is 80 kPa or less, preferably 60 kPa or less. These conditions facilitate removal of Fe by evaporation. Residual Fe can be further reduced by lowering the furnace internal pressure to within the ranges stated above. The lower limit of Fe concentration, however, is about 50 ppm according to the current method. Regarding the lower limit of the furnace internal pressure, 20 kPa is sufficient from a practical standpoint, although the actual limit depends on the capacity of the furnace.

Figure 3:
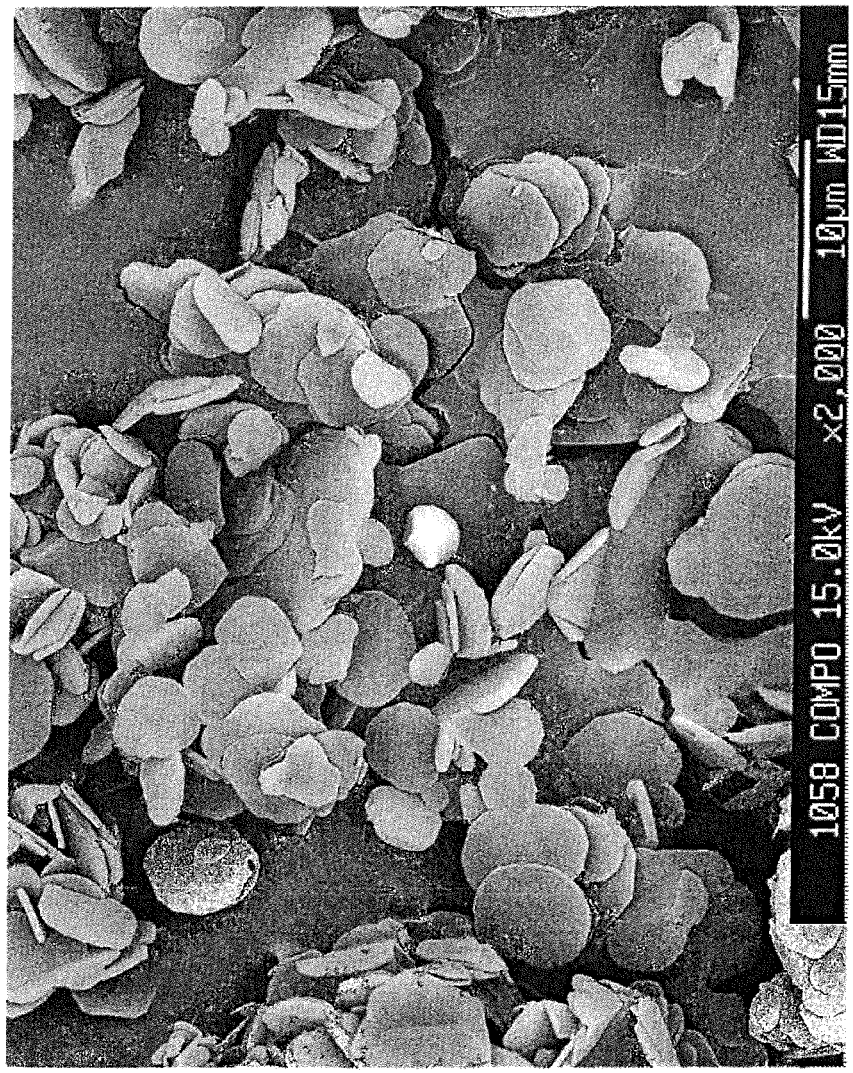
FIG. 3 is a microscope photograph of BN particles after decarbonization.
Figure 4:
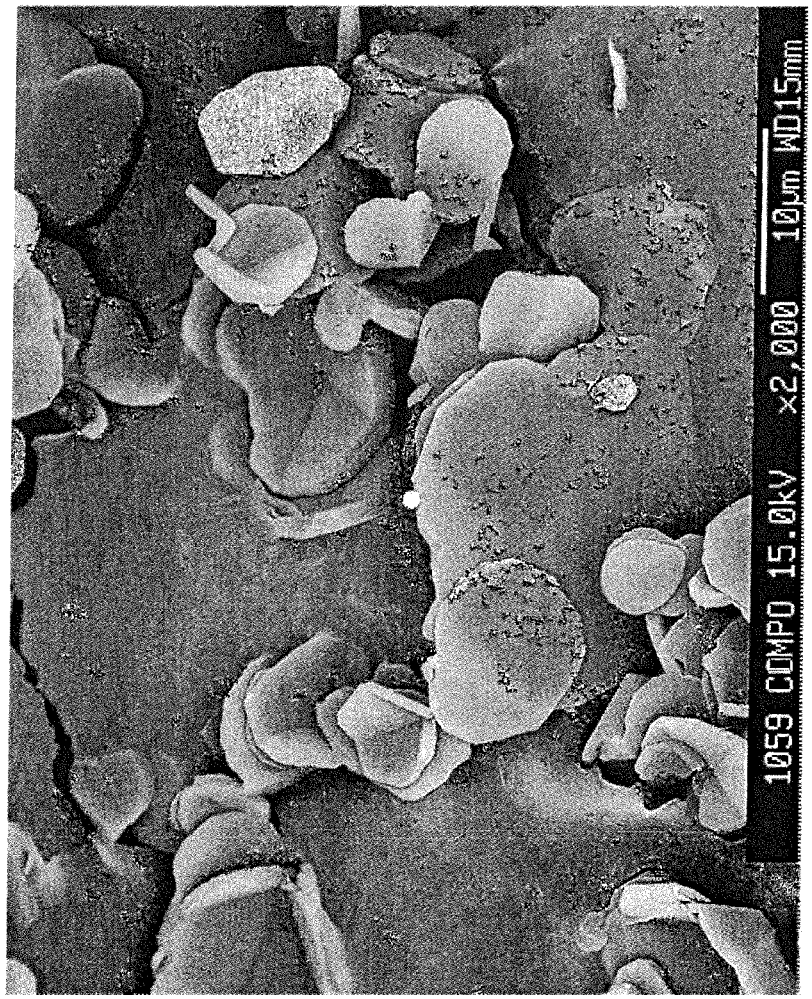
FIG. 4 is another microscope photograph of BN particles after decarbonization.
Figure 5:
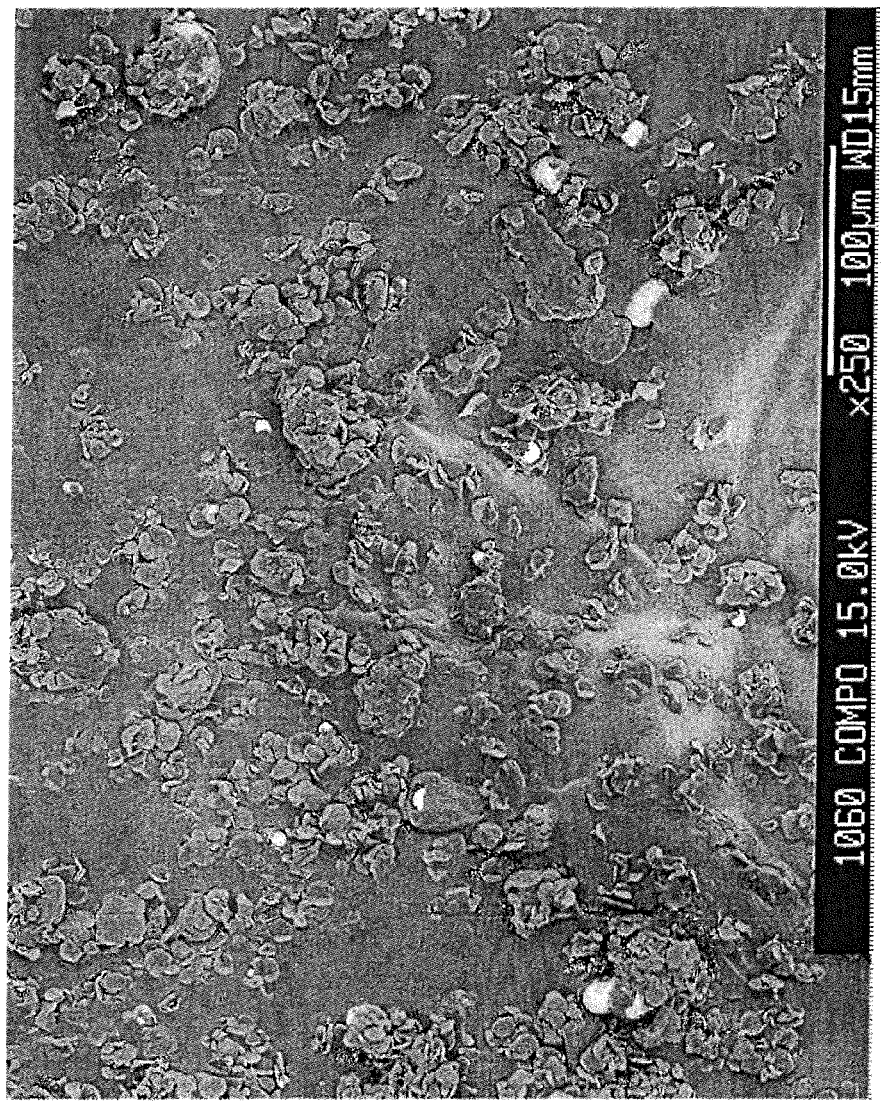
FIG. 5 is yet another microscope photograph of BN particles after decarbonization.

FIGS. 3-5 are microscope photographs of BN particles after the aforementioned treatment. FIGS. 3 and 4 show Fe derived from $B_4C$, in which Fe exists between adjacent BN particles. The Fe appears as white spheres (see middle of FIG. 4). FIG. 5 also shows Fe as white spheres and also in a form originating from the pulverizing device (hammer). Note that the Fe granules are generally dispersed over the field in the photograph.

Fe in BN can be removed by performing depressurization similar to that described above. This depressurization is not performed during nitridization but rather during subsequent decarbonization. When depressurization is performed during decarbonization, depressurization desirably is performed after completion of the decarbonization reaction because depressurizing before and during decarbonization causes a disadvantageous evaporative loss of $B_2O_3$ and the like necessary for decarbonization. When depressurization is performed during decarbonization the temperature desirably is kept generally in the range of 1500° C. to 2000° C. Providing a gas flow also effectively facilitates movement of Fe vapor away from the BN. The block of BN thus obtained is then subjected to pulverization and particle-size classification, to produce BN powder.

The Fe concentration in BN powder can be reduced to 500 ppm or less in a stable manner by conducting depressurization, as described above, for a sufficient length of time (e.g., for 1 to 15 hours). This depressurization also effectively and uniformly removes Fe from between BN particles. It also reduces the volume of residual units of Fe, thereby reducing the diameter of spherical Fe units, which prevents the deterioration of the electrically insulative properties of the BN powder. The diameter of the spherical units of Fe is preferably not greater than 50 μm. An achievable lower limit of the diameter is 0.2 μm.

According to the subject method, residual $B_2O_3$ can be effectively removed in a uniform manner by performing depressurization either during nitridization of $B_4C$ or after subsequent decarbonization. Removal of residual $B_2O_3$ increases the strength of the produced h-BN powder. Also achieved in a stable manner is a relatively high bulk density of the h-BN powder (within the range of 0.5 g/cm³ to 1.0 g/cm³).

Comparing the ratio of long diameter with respect to thickness of primary particles of BN powder produced by the subject methods, the ratio achieved by the subject method is in the range of 5 to 10, while the ratio achieved by conventional methods is in the range of 11 to 15. Therefore, BN powder particles produced by the subject method are more spherical than produced by conventional methods. The ratio of long diameter to thickness of a primary particle of BN powder can be determined by measuring long diameters and thicknesses of primary particles using an electron microscope. Average values of the long diameters and thicknesses are calculated and used to determine a ratio of the averages. Examples of the present invention are described below.

Example 1

Figure 6:
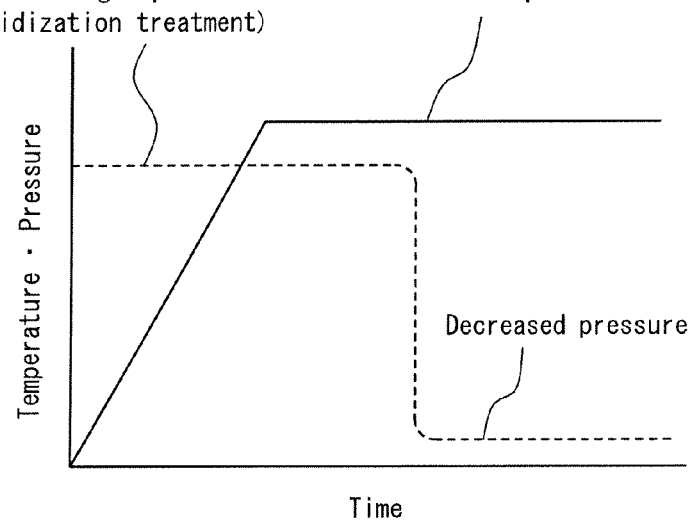
FIG. 6 is a diagram showing optimum thermal history and depressurization conditions in a case where depressurization is performed during nitridization.

Commercially available boron carbide powder (purity: 98% (w/w) was sieved through a 44-μm sieve. The raw material powder thus sieved (101.8 g) was charged into a carbon crucible (90 mm inner diameter, height 100 mm) and baked (for nitridization) in a nitrogen atmosphere at a constant furnace internal pressure and temperature of 2000° C. for 10 hours. To achieve a nitridization condition, the furnace interior was depressurized to 100 kPa or less when the furnace temperature reached at least 1800° C., as shown in FIG. 6. The yield of each of sample products thus obtained by baking was 176.6 g.

A portion (69.3 g) of each sample product produced by baking was collected and mixed with 35.2 g of commercially available $B_2O_3$. Mixing was performed using a V-blender with an inner volume of 1 L. The blender was rotated for 30 minutes at a rotational frequency of 1 Hz. The powdery mixture thus obtained was charged into a carbon crucible (90 mm inner diameter, 100 mm height) and decarbonized in a flow of nitrogen at 2000° C. for 10 hours for a "second baking." The product of the second baking was collected.

The product of the second baking was a white agglomerated particle body. After pulverizing the agglomerated particle body, X-ray diffraction analysis was conducted, which revealed that the product almost entirely constituted h-BN. The carbon content in the product powder was measured by using a tubular electrical-resistance furnace (manufactured by Shimadzu Corporation) according to the infrared absorption method. The oxygen content in the product powder was measured by using a simultaneous oxygen and nitrogen analyzer ("EMGA-550" manufactured by HORIBA, Ltd.), according to an inner gas-impulse heat melting method for determining thermal conductivity. Fe content in the product powder was measured by phenanthroline absorption spectroscopy (JIS K 0102) or acid-dissolution ICP-mass spectroscopy. The quantitative results were compared to spherical residual Fe particles imaged in electron-microscope photographs. Specifically, at least 25 images of Fe having diameter of at least 10 μm in the electron-microscope photographs were analyzed. Average diameters were calculated from these images, thereby providing estimates of the diameters of spherical Fe.

The h-BN powder thus obtained was classified by particle size. Various powder fractions were prepared having different sizes of agglomerated powder bodies and different bulk densities. Average long diameters (D), average thicknesses (d), average particle diameters ($D_{50}$), void rates of the agglomerated particle bodies, powder strengths, and bulk densities of the BN powder products were analyzed. The results are listed in Tables 1A and 1B. Incidentally, an increase in the charge ratio of h-BN powder to resin generally increases viscosity of the mixture, which encourages generation of voids in the product h-BN. These consequences may compromise an otherwise improved thermal conductivity, reduce the electrically insulative property, and eventually reduce the breakdown voltage of the product h-BN. In view of this, a respective composite sheet was produced from each of the BN powder samples and resin at the maximum possible charge ratio of BN powder, i.e., the maximum viscosity that narrowly allowed molding of the mixture. Epoxy resin "Epicoat 807" (manufactured by Japan Epoxy Resin Co., Ltd.) was used as the resin, and "Epicure 807" (modified alicyclic amine-grade curing agent manufactured by Japan Epoxy Resin Co., Ltd.) was used as the curing agent. Each of the BN powder samples was added to a respective unit of the resin at the maximum possible charge ratio at which molding was narrowly possible. The BN powder thus charged was evenly dispersed in the resin, and the mixture was molded into a respective sheet, which provided test pieces for measurements. Thermal conductivity and breakdown voltage properties of each of the composite sheets thus prepared were analyzed. Also analyzed were concentrations of impurities and the diameters of spherical Fe in each of the BN powder samples. The results of these analyses are listed in Table 2.

Methods for evaluating respective physical properties are as follows. (1) (Bulk Density) Each powder sample was dried at 105° C. until no further change in weight was observed. A portion (3.0 g) of each dried sample was accurately weighed and charged into a 20 mL graduated test tube. The test tube was set in a holder with a lid and dropped 400 times from a 45-mm height at a rate of one drop/2 seconds. Then, the volume was read and used to calculate the bulk density of the powder sample. (2) (Thermal Conductivity) A test piece (diameter: 10 mm×thickness: 2 mm) was cut out of each of the molded sheets and used for measuring thermal conductivity of the sheet. Thermal conductivity of each test piece was measured by a laser flash method. (3) (Breakdown Voltage) Dielectric breakdown voltage (KV), as an indicator of the withstanding voltage, of a solid electrically insulative material, is measured as a withstand voltage exhibited by a sample having a thickness of 0.4 mm, exposed to a rate of voltage increase of 1 kV/sec (JIS C 2110).

TABLE 1A

| | Nitridization treatment | | Depressurization in nitridization treatment | | Decarbonizing treatment | |
|---|---|---|---|---|---|---|
| No. | Temperature at which gas atmosphere was retained (° C.) | Time (h) | Furnace internal pressure (kPa) | Time (h) | Temperature at which gas atmosphere was retained (° C.) | Time (h) |
| 1 | Nitrogen gas 2000 | 10 | Not applied | | Nitrogen gas 2000 | 10 |
| 2 | Nitrogen gas 2000 | 10 | 100 | 5 | Nitrogen gas 2000 | 10 |

TABLE 1A-continued

| | Nitridization treatment | | Depressurization in nitridization treatment | | Decarbonizing treatment | |
|---|---|---|---|---|---|---|
| No. | Temperature at which gas atmosphere was retained (°C.) | Time (h) | Furnace internal pressure (kPa) | Time (h) | Temperature at which gas atmosphere was retained (°C.) | Time (h) |
| 3 | | | 80 | | | |
| 4 | | | 60 | | | |
| 5 | | | 10 | | | |
| 6 | | | 1 | | | |
| 7 | Nitrogen gas 2000 | 10 | 100 | 10 | Nitrogen gas 2000 | 10 |
| 8 | | | 80 | | | |
| 9 | | | 10 | | | |

TABLE 1B

| | BN powder | | | | | | | |
|---|---|---|---|---|---|---|---|---|
| | Primary particle | | | Agglomerated particle body | | | | |
| No. | Average long diameter D (μm) | Average thickness d (μm) | D/d | Average particle diameter $D_{50}$ (μm) | Void ratio (%) | Strength | Bulk density (g/cm³) | Note |
| 1 | 3.05 | 0.27 | 11.30 | 43.6 | 58 | 0.33 | 0.44 | Conventional Example |
| 2 | 2.44 | 0.25 | 9.71 | 68.2 | 56 | 0.35 | 0.47 | Comp. Example |
| 3 | 3.20 | 0.34 | 9.41 | 69.2 | 49 | 0.40 | 0.53 | Example |
| 4 | 3.15 | 0.35 | 8.97 | 59.5 | 49 | 0.43 | 0.57 | Example |
| 5 | 2.80 | 0.32 | 8.75 | 49.3 | 41 | 0.45 | 0.69 | Example |
| 6 | 2.69 | 0.33 | 8.15 | 44.4 | 41 | 0.48 | 0.72 | Example |
| 7 | 3.73 | 0.42 | 8.88 | 71.7 | 53 | 0.36 | 0.46 | Comp. Example |
| 8 | 3.01 | 0.39 | 7.72 | 68.3 | 48 | 0.41 | 0.59 | Example |
| 9 | 2.70 | 0.33 | 8.18 | 58.3 | 43 | 0.44 | 0.63 | Example |

TABLE 2

| | Impurities | | | | Sheet properties | | | |
|---|---|---|---|---|---|---|---|---|
| | Concentration (ppm) | | | Diameter of spherical Fe | BN charge ratio | Thermal conductivity | Withstand voltage | |
| No. | Fe | C | O | (μm) | (mass %) | (W/m · K) | properties* | Note |
| 1 | 895 | 0.02 | 0.1 | 73 | 55 | 4.1 | Reference | Conventional Example |
| 2 | 634 | 0.01 | 0.1 | 51 | 60 | 4.8 | No improvement | Comp. Example |
| 3 | 455 | 0.01 | 0.1 | 49 | 60 | 5.4 | ○ | Example |
| 4 | 394 | 0.01 | 0.1 | 47 | 60 | 5.8 | ○ | Example |
| 5 | 246 | 0.01 | 0.1 | 44 | 60 | 6.1 | ⊚ | Example |
| 6 | 70 | 0.01 | 0.1 | 43 | 60 | 6.5 | ⊚ | Example |
| 7 | 558 | 0.01 | 0.1 | 51 | 60 | 3.8 | No improvement | Comp. Example |
| 8 | 295 | 0.01 | 0.1 | 47 | 60 | 6.6 | ○ | Example |
| 9 | 153 | 0.01 | 0.1 | 42 | 60 | 7.2 | ⊚ | Example |
| 10 | Resin only | | | | — | 0.2 | — | Extreme Example |

○: Dielectric breakdown voltage of the Example/that of Conventional Example (No. 1) is in the range of 1.1 to 1.3
⊚: Dielectric breakdown voltage of the Example/that of Conventional Example (No. 1) exceeds 1.3

As shown in Tables 1A, 1B, and 2, each sample of h-BN powder according to the invention exhibited a powder strength of at least 0.4, a bulk density of at least 0.5, and at least a 60% maximum ratio of charge to resin, which demonstrated excellent thermal conductivity and withstand-voltage properties. Specifically, each sample of h-BN powder according to the invention had a thermal conductivity at least 1.3 times the thermal conductivity of a conventional control. Each sample of h-BN according to the invention also had a significant reduction of Fe concentration and Fe particle diameter, resulting from the depressurization step, compared to conventional and comparative examples (which did not include a depressurization step). Each example of h-BN according to the invention also exhibited withstand-voltage properties that were improved, relative to controls, due to a synergetic effect caused by the aforementioned superior effects in combination with better chargeability, compared with conventional and comparative examples. Regarding the withstand-voltage properties shown in Table 2, "○" represents good improvement over controls, wherein the ratio of dielectric breakdown voltage of the example with respect to that of a conventional Example (No. 1) is in the range of 1.1 to 1.3. The "⊚" symbol represents a very good improvement over controls, wherein the ratio of dielectric-breakdown voltage of the example to that of the conventional example (No. 1) exceeded 1.3. In contrast, the h-BN powder obtained by the conventional method exhibited a powder strength of 0.33, a bulk density of 0.44, and a maximum possible charge ratio with respect to resin of less than 60%. It is clear from these data that thermal conductivity and withstand-voltage properties of the conventional example were poor compared to the examples made according to the present invention.

Example 2

Commercially available boron carbide powder (purity: 98% (w/w)) was sieved using a 44-μm sieve. The raw material powder thus sieved (101.8 g) was charged into a carbon crucible (90-mm inner diameter, 100-mm height) and baked (for nitridization) in a nitrogen atmosphere in a furnace at a constant pressure, a temperature of 2000° C., for 10 hours. A 69.3-g portion of the product was collected and mixed with 35.2 g of commercially available $B_2O_3$. The mixing was performed using a V-blender having an inner volume of 1 L, while rotating the blender for 30 minutes at a frequency of 1 Hz.

The powdery mixture obtained by mixing was charged into a carbon crucible (90-mm inner diameter, 100-mm height) and subjected to decarbonization conditions including a nitrogen flow at 2000° C. for 10 hours. Depressurization was conducted by maintaining the furnace internal pressure at 100 kPa or less at a furnace temperature of 2000° C. The yield of each of sample product obtained by the second baking was 176.6 g.

Each product thus obtained by the second baking was a respective white agglomerated particle body. From X-ray diffraction analyses conducted after pulverizing the agglomerated particle body, it was confirmed that the product was almost entirely h-BN. Determinations were also made of C, O, and Fe content of each sample, as well as diameter of spherical Fe particles in the powder, determined as described in Example 1.

Each h-BN powder product thus obtained was classified by particle size, to prepare various powder fractions having different sizes of agglomerated powder bodies and different bulk densities. The average long diameter (D), average thickness (d), average particle diameter ($D_{50}$), and void ratio of the agglomerated particle bodies were determined. Also, powder strength and bulk density of the BN powder products were analyzed. Tables 3A and 3B show the results of the analysis. A respective composite sheet was produced from each of the BN powder samples and resin in the same manner as described in Example 1. With each sheet, thermal conductivity and withstand-voltage properties were also determined. Also determined were concentrations of impurities and the diameters of spherical Fe in the BN powder samples. The results of these analyses are shown in Table 4.

TABLE 3A

| No. | Nitridization treatment | | Decarbonization | | Depressurization after | | |
|---|---|---|---|---|---|---|---|
| | Temperature at which gas atmosphere was retained | Time (h) | Temperature at which gas atmosphere was retained | Time (h) | Temperature at which gas atmosphere was retained | Furnace internal pressure (kPa) | Time (h) |
| 11 | Nitrogen gas | 10 | Nitrogen gas | 10 | Nitrogen gas | 100 | 5 |
| 12 | 2000 | | 2000 | | 2000 | 80 | |
| 13 | (° C.) | | (° C.) | | (° C.) | 60 | |
| 14 | | | | | | 10 | |
| 15 | | | | | | 1 | |
| 16 | Nitrogen gas | 10 | Nitrogen gas | 10 | Nitrogen gas | 100 | 5 |
| 17 | 2000 | | 2000 | | 2000 | 80 | |
| 18 | (° C.) | | (° C.) | | (° C.) | 10 | |

TABLE 3B

| | BN powder | | | | | | |
|---|---|---|---|---|---|---|---|
| | Primary particle | | | Agglomerated particle body | | | |
| No. | Average long diameter D (μm) | Average thickness d (μm) | D/d | Average particle diameter $D_{50}$ (μm) | Void ratio (%) | Strength | Bulk density (g/cm³) | Note |
| 11 | 3.89 | 0.42 | 9.26 | 70.3 | 55 | 0.37 | 0.47 | Comp. Example |
| 12 | 3.72 | 0.39 | 9.54 | 56.2 | 49 | 0.40 | 0.54 | Example |
| 13 | 2.69 | 0.31 | 8.68 | 62.1 | 47 | 0.42 | 0.61 | Example |
| 14 | 3.09 | 0.35 | 8.83 | 50.6 | 43 | 0.45 | 0.60 | Example |
| 15 | 3.37 | 0.41 | 8.22 | 46.2 | 41 | 0.48 | 0.70 | Example |
| 16 | 3.86 | 0.43 | 8.98 | 71.2 | 52 | 0.38 | 0.48 | Comp. Example |
| 17 | 3.98 | 0.43 | 9.26 | 64.7 | 47 | 0.41 | 0.58 | Example |
| 18 | 3.66 | 0.39 | 9.38 | 51.2 | 43 | 0.43 | 0.63 | Example |

TABLE 4

| | Impurities | | | | Sheet properties | | |
| --- | --- | --- | --- | --- | --- | --- | --- |
| | Concentration (ppm) | | | Diameter of spherical | BN charge ratio | Thermal conductivity | Withstand voltage | |
| No. | Fe | C | O | Fe (μm) | (mass %) | (W/m·K) | properties* | Note |
| 11 | 597 | 0.01 | 0.1 | 52 | 60 | 4.7 | No improvement | Comp. Example |
| 12 | 398 | 0.01 | 0.1 | 49 | 60 | 5.2 | ⊚ | Example |
| 13 | 329 | 0.01 | 0.1 | 49 | 60 | 5.6 | ⊚ | Example |
| 14 | 273 | 0.01 | 0.1 | 44 | 60 | 6.2 | ⊚ | Example |
| 15 | 91 | 0.01 | 0.1 | 42 | 60 | 6.8 | ⊚ | Example |
| 16 | 573 | 0.01 | 0.1 | 52 | 60 | 4.3 | No improvement | Comp. Example |
| 17 | 301 | 0.01 | 0.1 | 46 | 60 | 6.7 | ⊚ | Example |
| 18 | 199 | 0.01 | 0.1 | 42 | 60 | 7.1 | ⊚ | Example |

⊚: Dielectric breakdown voltage of the Example/that of Conventional Example (No. 1) exceeds 1.3

As shown in Tables 3A, 3B, and 4, each example of h-BN powder according to the invention exhibits a powder strength of at least 0.4, a bulk density of at least 0.5, and a maximum charge ratio with respect to resin of at least 60%, thereby demonstrating excellent thermal conductivity and ability to withstand high breakdown voltages. Regarding the ability to withstand high breakdown properties, each sample exhibited a ratio of dielectric breakdown voltage, relative to the conventional example (No. 1), exceeding 1.3. The comparative examples were produced under conditions beyond the optimum ranges of the present invention. Consequently, each comparative example had a concentration of Fe that exceeded the tolerable value, which resulted in poorer powder strength and lower bulk density than exhibited by the Examples prepared according to the present invention. Each comparative example also had poorer thermal conductivity and poorer withstand-voltage properties than the Examples according to the present invention.

Figure 7:
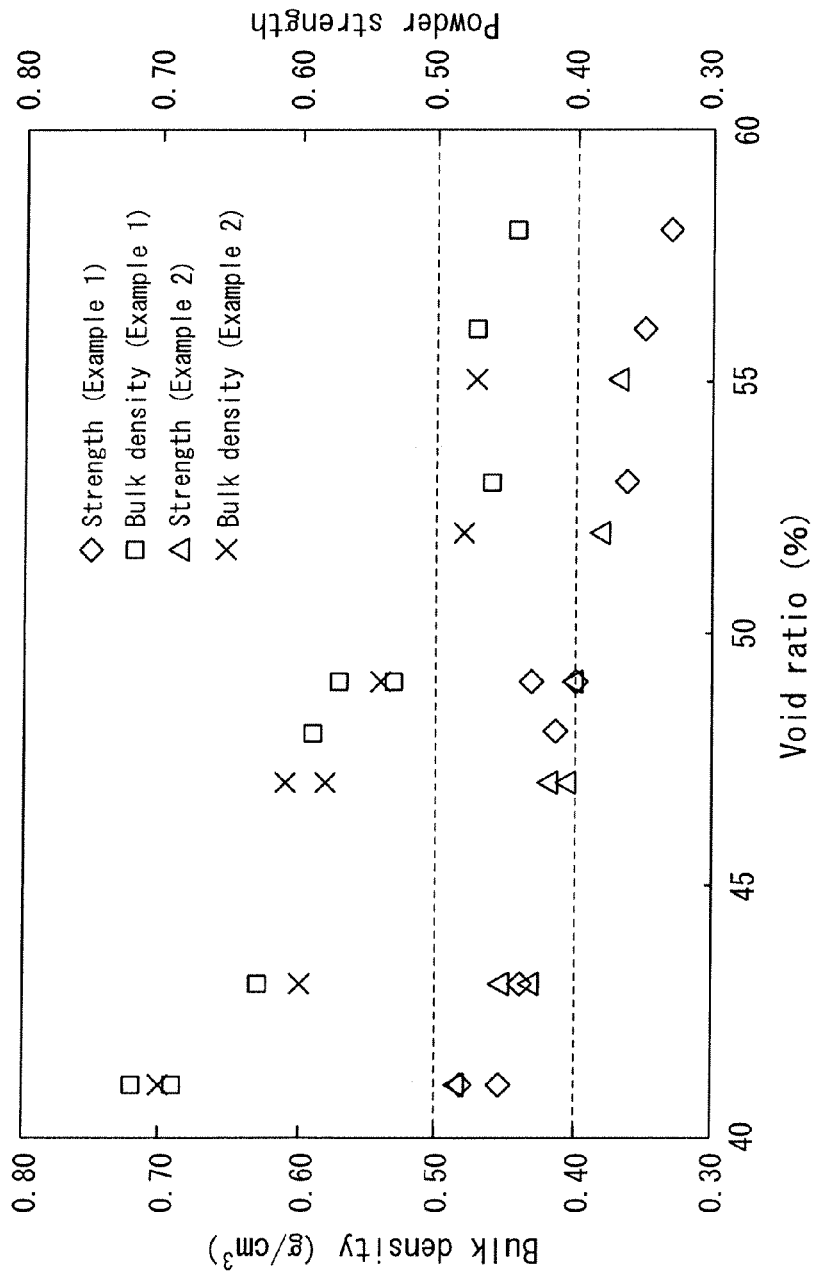
FIG. 7 is a graph showing relationships between void ratio, bulk density, and strength of h-BN powder.
Figure 8:
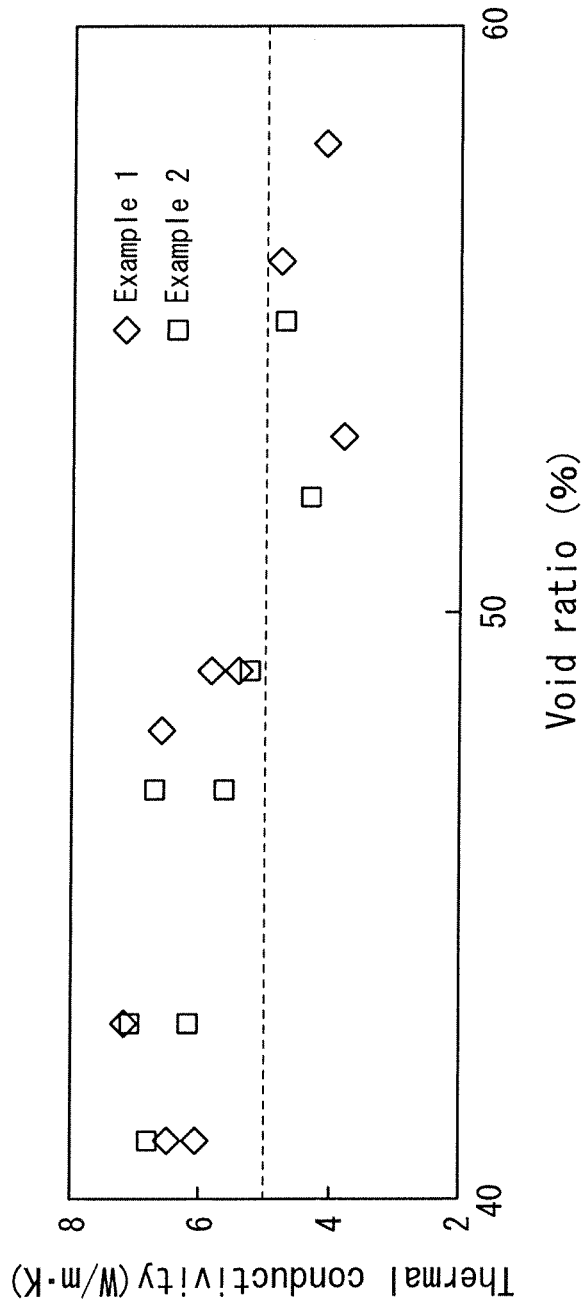
FIG. 8 is a graph showing the relationship between void ratio and thermal conductivity.

Based on the data shown in Tables 1A, 1B, 2, 3A, 3B, and 4, FIG. 7 summarizes the relationships between void ratio, bulk density, and powder strength. FIG. 8 summarizes the relationships of void ratio and thermal conductivity. It is understood from FIG. 7 that decreasing the void ratio to 50% or less enhances bulk density to 0.50 g/cm³ or higher and powder strength to 0.40 or higher. FIG. 8 shows that decreasing the void ratio to 50% or less results in good thermal conductivity, i.e., at least 5.0 W/m·K.

INDUSTRIAL APPLICABILITY

According to the present invention, chargeability of h-BN powder with respect to resin is improved. Also, the thermal conductivity of a heat-dissipation sheet or film made of the h-BN powder is enhanced by making the agglomerated particle bodies of h-BN powder denser, making the shape of particles of the powder more spherical, and increasing the strength of the powder. Further, according to the present invention, residual Fe in the h-BN powder can be effectively removed to improve the electrically insulative property of the powder. If some Fe remains in the powder, the shape of this residual Fe is made spherical and thus harmless. No post-treatment is required after production of the h-BN powder, which allows reduction of processing time and production cost. The type of resin is not particularly limited; any of various resins used in electric/electronic parts in general can be used.

The invention claimed is:

1. A hexagonal boron nitride powder, characterized in that:
   primary particles of the powder exhibit a ratio (D/d) of long diameter (D) to thickness (d) in a range of 5 to 10;
   agglomerated particle bodies made of the primary particles have an average particle diameter ($D_{50}$) in a range of 2 μm to 200 μm, inclusive; and
   the powder has a bulk density in a range of 0.5 g/cm³ to 1.0 g/cm³ and impurity Fe at a concentration not greater than 500 ppm, the impurity Fe being as spherical particles having respective diameters not greater than 50 μm.

2. The hexagonal boron nitride powder of claim 1, wherein the average particle diameter ($D_{50}$) and void ratio of the agglomerated particle body are in a range of 20 μm to 80 μm, inclusive, and not greater than 50%, respectively.

3. The hexagonal boron nitride powder of claim 2, having a powder strength of at least 0.4, wherein:
   powder strength is represented by a ratio of one average particle diameter to another average particle diameter of the agglomerated particle body;
   the one average particle diameter is obtained by injecting hexagonal boron nitride powder at a pressure of 0.3 MPa in a dry condition and measuring particle diameters of the agglomerated particle bodies; and
   the another average particle diameter is obtained by injecting hexagonal boron nitride powder at a pressure of 0.01 MPa in a dry condition and measuring particle diameters of the agglomerated particle bodies.

4. The hexagonal boron nitride powder of claim 2, wherein the agglomerated particle body is produced by baking.

5. The hexagonal boron nitride powder of claim 4, having a powder strength of at least 0.4, wherein:
   powder strength is represented by a ratio of one average particle diameter to another average particle diameter of the agglomerated particle body;
   the one average particle diameter is obtained by injecting hexagonal boron nitride powder at a pressure of 0.3 MPa in a dry condition and measuring particle diameters of the agglomerated particle bodies; and
   the another average particle diameter is obtained by injecting hexagonal boron nitride powder at a pressure of 0.01 MPa in a dry condition and measuring particle diameters of the agglomerated particle bodies.

6. The hexagonal boron nitride powder of claim 1, wherein the agglomerated particle body is produced by baking.

7. The hexagonal boron nitride powder of claim 6, having a powder strength of at least 0.4, wherein:
- powder strength is represented by a ratio of one average particle diameter to another average particle diameter of the agglomerated particle body;
- the one average particle diameter is obtained by injecting hexagonal boron nitride powder at a pressure of 0.3 MPa in a dry condition and measuring particle diameters of the agglomerated particle bodies; and
- the another average particle diameter is obtained by injecting hexagonal boron nitride powder at a pressure of 0.01 MPa in a dry condition and measuring particle diameters of the agglomerated particle bodies.

8. The hexagonal boron nitride powder of claim 1, produced by a method comprising the steps of:
- nitridizing boron carbide in a nitrogen atmosphere having a nitrogen partial pressure of at least 5 kPa and a temperature of 1800° C. to 2200° C., thereby forming a nitridization product;
- to the nitridization product, adding $B_2O_3$ and/or a precursor thereof, thereby forming a mixture;
- decarbonizing the mixture in a non-oxidizing atmosphere at a temperature of 1500° C. to 2200° C., thereby forming a decarbonization product; and
- pulverizing and classifying the decarbonization product according to particle size, thereby producing hexagonal boron nitride powder;
- wherein, during nitridization or after decarbonization, depressurization is performed at a pressure less than 100 kPa.

* * * * *